June 7, 1949.         B. HYBLER         2,472,078
ELECTRIC HEADLIGHTING FOR VEHICLES
Filed May 3, 1946
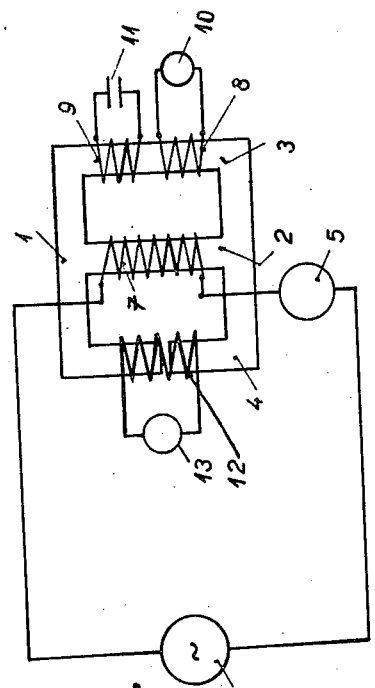
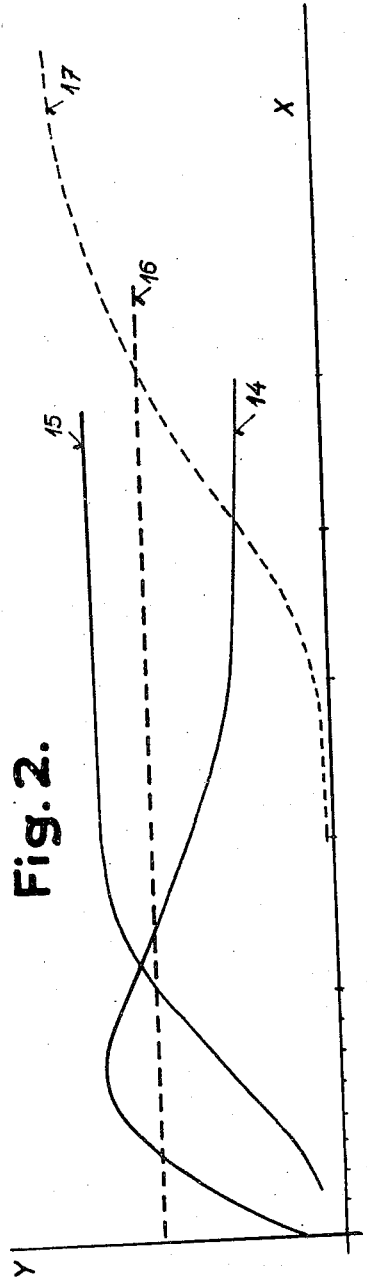
INVENTOR
Břetislav Hybler
By Watson, Cole, Grindle & Watson
ATTYS Patented June 7, 1949

2,472,078

UNITED STATES PATENT OFFICE 2,472,078

ELECTRIC HEADLIGHTING FOR VEHICLES

Břetislav Hybler, Hubalov, Czechoslovakia

Application May 3, 1946, Serial No. 666,889
In Czechoslovakia September 26, 1945

5 Claims. (Cl. 315—79)

The present invention relates to the illumination of the path of a vehicle which has no auxiliary source of power for use at low speeds, e. g. no accumulator which would deliver energy in case of reduction in speed, under which conditions owing to the reduced number of revolutions of the wheels the energy of the electrical source incorporated in and driven by the vehicle is insufficient. The device according to the invention has the advantage that with increasing speed of the vehicle the illumination of distant portions of the path increases. The invention is applicable to all kinds of vehicles, for example automobiles, motor cycles, bicycles, wagons, carriages, tractors and the like but it is of special applicability to a cycle and this application will therefore be described in more detail by way of example.

Cycles fitted with an incandescent lamp and fixed associated reflector, the lamp being fed by an alternating current generator, have the disadvantage that when traveling slowly, or when the cycle is pushed, the output of the generator in consequence of its low speed of revolution is so small that the illumination of the lamp is altogether insufficient, so that the traveller must proceed without illumination, which is unpleasant and even dangerous, because of the possibility of a collision due to the invisibility of the cycle. It is not practicable to use a lamp of lower voltage as such a lamp would burn out at higher speeds due to the higher revolutions of the generator. A further disadvantage of the known arrangement is that the utilisation of the light energy is most uneconomical, as the voltage for the lamp is chosen to suit maximum speed and consequently at medium speeds the lamp glows far below its maximum and uses too much electrical energy in proportion to the light energy delivered. The known devices which have a single lamp only and a reflector arranged to illuminate a distant portion of the vehicle path, have the further disadvantage that at slow speeds, at which the output is small, the light energy is scattered in the distance so that the total illumination is a minimum.

The present invention is based on the recognition that it is necessary with a vehicle to make the distance to which its path is illuminated commensurate with the manœuvring speed of the vehicle. In other words, during rapid travel the path must be illuminated at a distance, in order to give the rider necessary room for manœuvring or braking, while when travelling slowly or when pushing a cycle the path must be illuminated immediately in front of it. For slow travel illumination at a distance is of no use.

The above-mentioned disadvantages are removed, according to the invention, by providing two or even three light sources, each of which comes into operation at a determined speed of the vehicle to illuminate its own selected portion of the path only, and which are so arranged that the portions of the path illuminated by the beams of the light sources partially overlap. These light sources are supplied with alternating current, the frequency of which increases with the speed of the vehicle, by means of a current or voltage divider in such a way that the light sources operate consecutively in dependence on the speed of the vehicle and automatically take from one another at a determined speed of the vehicle, to illuminate the corresponding portion of the path. In this way, for example in the arrangement with two light sources, at low speeds the lamp illuminating the portion of the path immediately in front of the vehicle is alone operative, whilst at higher speeds this lamp is automatically extinguished, and at normal medium speeds only the other lamp is operative, i. e. the one illuminating the distant part of the path. Having regard to the fact that the lamps are so arranged that their light beams overlap, as already stated, the impression is given, when riding, that the illumination of the path at a distance increases proportionally with speed. At lower speeds, when the path immediately in front of the cycle is illuminated and there is therefore a comparatively small area of illumination, it is sufficient to use a light source with a small consumption of electrical energy, which is advantageous because the output of the generator at low speeds is small. The second light source for illuminating at a greater distance at higher speeds can be chosen to have a greater consumption, which is permissible because the output of the generator will have increased at higher speeds.

The automatic consecutive operation of the individual light sources in correspondence with the speed of the vehicle is, according to the invention, provided by a regulating device shown in Fig. 1 of the accompanying drawings. The current relationship between the regulator and speed of the vehicle is shown in Fig. 2.

According to the invention the current is distributed between the light sources by an iron core 1 with three legs 2, 3, 4, each of which legs carries a winding for the corresponding light source, which illuminates that part of the path in front of the vehicle of length appropriate to the speed. On the central leg 2 is a winding 7 connected in series with a lamp 5 which illuminates the portion of the path appropriate to the manœuvring distance at medium speeds of the vehicle. The lamp 5 and winding 7 are connected across the generator 6. One of the side legs, e. g. 3, is provided with a double winding 8, 9. In parallel with one of these windings, 9, is a condenser 11 and in parallel with the other a lamp 10 which illuminates the portion of path appropriate to minimum speed of the vehicle. The third leg is interrupted by a small air gap and, if necessary, provided with a winding 12 which feeds the lamp 13 for illuminating the portion of the path appropriate to maximum speed. In practice it is possible with vehicles which do not reach a great speed, e. g. bicycles, to omit this third lamp. For this reason the winding 12 and lamp 13 are shown in chain lines in the drawing.

The apparatus according to the invention operates as follows. At low speeds, and therefore at low frequencies, the windings 7 and 8 operate as an ordinary transformer so that the whole of the energy from winding 7 flows into winding 8 and is consumed in the lamp 10. As this is a lamp of small power consumption it lights up even at low speeds of the generator when the latter can only supply a small amount of power. The lamp 5 offers at this time no large resistance, having regard to the fact that it is a lamp of high power consumption and the resistance of its filament in the cold condition is small. The winding 7 therefore operates as an inductive reactance.

As the frequency increases, a voltage drop occurs across the winding 8 due to the condenser connected across the winding 9, and there is consequently a reduction in the light energy emitted by the lamp 10.

Due to the action of the condenser, the inductive effect of the winding 7 on the central leg diminishes, which causes a rise in the current flowing through the winding 7, and therefore through the lamp 5, which begins to light up intensively. The circuit constants are so chosen that the lamp 5 has a practically normal voltage across it when the voltage across the lamp 10 has only dropped slightly.

These conditions can be well seen from Fig. 2 in which the speed of the vehicle is shown as abscissae and the voltage across the lamp as ordinates. The curve 14 shows the voltage across the lamp 10 which illuminates the near part of the path at low speeds. The curve 15 shows the voltage across the lamp 5 which illuminates the distant part of the path at high speeds. The line 16 parallel to the X axis shows the voltage at which the lamps 10 and 5 begin to glow.

On sufficient increase in the speed and therefore of the frequency, the lamp 10 is extinguished due to the action of the condenser 11. As however the field of the winding 7 can close over the leg 4, the winding 7 now begins to act as a choke coil and to choke the current flowing through the lamp 5. Consequently the current flowing through the lamp 5 is automatically limited and there is no possibility of this lamp burning out. The size and the beginning of the choke action can be regulated by the size of the air gap. The behaviour of the winding can best be understood from the known formula:

$$J = \frac{E}{\sqrt{R^2 + X^2}}$$

in which J is the current, E is the voltage across the winding 7, R its ohmic resistance and X its inductive reactance. As E rises proportionally with the frequency, i. e. $E = E_1 f$, and the inductive reactance also rises proportionally with the frequency, i. e. $X = E_2 f$, the above equation can be written $$J = \frac{E_1 f}{\sqrt{R^2 = \left(\frac{E_2}{f}\right)^2}} = \frac{E_1}{E_2}$$

since with illuminating frequency $f$ the resistance R, which is considerably smaller than X, can be neglected in comparison with X. Therefore J and also E are approximately constant for the lamp 5 up to the maximum speed. It is therefore most advantageous for the given lamp 5 to choose such a voltage that at medium speeds the filament is not glowing too feebly and therefore achieve an optimum transformation of electrical into light energy without running the risk of the lamp burning out at high speeds. As the voltage drop during regulation is achieved by altering the reactance, the regulation takes place without energy losses.

For maximum speed the additional lamp 13 can be used, this being so arranged that it provides an additional illumination at a greater distance in front of the vehicle. The voltage across the lamp 13 in relation to the speed of the vehicle is shown by the curve 17 in Fig. 2.

The following are the advantages of the apparatus according to the invention. It enables a lamp of smaller power to be used to cater for the case when, in consequence of the small output of the generator at low speeds, insufficient energy is available for lighting the lamp necessary for illuminating the road during normal travel. In consideration of the fact that at low power output of the generator a small power lamp illuminates immediately in front of the vehicle the light is not scattered in the distance and is therefore sufficient for pushing and slow riding. Also the illumination of the road in the distance increases automatically with the speed of the vehicle. The regulation is effected without losses and it is possible to obtain full glowing of the filament at normal speeds and therefore a complete performance of the lamps with small input of energy. The generator can therefore be made of small dimensions, the lamps are in no way loaded by the increased voltage and a longer life is thereby achieved. The lamp for illuminating the path directly in front of the vehicle is automatically extinguished so that at normal travel no increased energy is necessary. The main lamp can, with a smaller power supply and better utilisation of the power, be so chosen that no increased effort is necessary when cycling at medium speeds with lamps operating with low light efficiency.

What I claim as my invention and desire to secure by Letters Patent is:

1. Electrical lighting equipment for a vehicle, comprising at least two light sources mounted thereon, an alternating current generator mounted on the vehicle and mechanically connected to be operated in accordance with the speed of the vehicle, and means electrically connecting said light sources with said generator, and so constructed that one of said light sources is fed with current of sufficient intensity to become luminous only at relatively low speeds of said vehicle, and the other of said light sources is fed with current of sufficient intensity to become luminous only at higher speeds of said vehicle, said last means comprising an iron core having at least two legs, and a winding on each of said legs, each said winding being in series with one of said light sources.

2. Electrical lighting equipment for a vehicle, comprising three light sources mounted thereon, an alternating current generator mounted on the vehicle and mechanically connected to be operated in accordance with the speed of the vehicle, and means electrically connecting said light sources with said generator, and so constructed that one of said light sources is fed with current of sufficient intensity to become luminous only at relatively low speeds of said vehicle, and another of said light sources is fed with current of sufficient intensity to become luminous only at relatively high speeds of said vehicle, said last means comprising an iron core having three legs and windings on said legs associated with said respective light sources, the winding on the middle leg of said core being connected in series with the generator and with that one of said light sources which reaches its maximum luminous intensity at the normal speed of said vehicle.

3. Apparatus according to claim 1, said light sources being so positioned on the vehicle as to illustrate separate but overlapping portions of the vehicle path.

4. Apparatus according to claim 1 including a winding in parallel with the winding which is in series with the low speed light source and across which is connected a condenser.

5. Apparatus according to claim 2, one outside leg of said iron core being interrupted to provide an air gap and the other outside leg of said core being provided with a winding across which is connected a condenser.

BŘETISLAV HYBLER.

No references cited.